Dec. 8, 1970   G. B. ANDERSON ET AL   3,545,319

TOOL BLOCK

Filed Feb. 3, 1969

INVENTOR
GEORGE B. ANDERSON
FREDERIC WILLIAM YOUNG

BY
*W. Eshinger*
ATTORNEY

United States Patent Office 3,545,319
Patented Dec. 8, 1970

3,545,319
TOOL BLOCK
George B. Anderson, Rochester, and Frederic William Young, Canadaigua, N.Y., assignors to USM Corporation, Rochester, N.Y., a corporation of New Jersey
Filed Feb. 3, 1969, Ser. No. 795,819
Int. Cl. B23b 29/26
U.S. Cl. 82—36
7 Claims

ABSTRACT OF THE DISCLOSURE

This tool block is formed with a tongue or projection that engages in a groove of the cross-slide, for instance of a lathe. It is held releasably in place by a clamp bar or cam that is rotatable in a clamping member. The tool block has a concave rear surface above the tongue or projection. The clamp bar or cam has a cylindrical surface around part of its periphery, but is recessed around the rest of its periphery. When the cylindrical portion of the periphery of the clamp bar seats on the concave rear surface of the tool block and bolts are tightened to tighten the clamping member on the slide, the clamp bar by engagement with said concave surface will lock the tool block securely in place on the cross-slide. By loosening the bolts slightly, the clamp bar can be rotated to bring its recess into registry with the concave surface of the tool block to release the tool block; and the tool block can readily be lifted off the cross-slide.

---

The present invention relates to tool holders, and more particularly to tool blocks for mounting cutting tools on lathes and similar machine tools. In a still more specific aspect, the invention relates to an improvement on the tool block disclosed in the pending application of George B. Anderson, Ser. No. 747,693, filed July 25, 1968.

Prior to the invention of the Anderson application, it was the practice to secure a tool block to a lathe by bolts passing through the tool block and threading into the cross slide or other part of the lathe, or by clamps which engaged over the tool block, or a part thereof, and which, in turn, were secured to the tool slide or other part of the lathe. To remove the tool block from the lathe, where the block was secured directly by bolts, the bolts had to be completely unthreaded from the slide, or other part, to which they were secured. Where the block was secured in place by a clamp that was fastened in clamping position by bolts, the bolts still had to be unthreaded from the slide or other part of the lathe before the tool block could be removed. To fasten a new tool block in place required rethreading of the bolts in position.

All of this took time; and a valuable machine was standing idle while the tools were being changed.

The primary object of the present invention is to provide improved means for quickly and securely locking a tool block in place on a lathe, means which will permit quick removal of the tool block from the lathe and substitution of another tool block therefor.

Another object of the invention is to provide a tool block which will always locate a tool precisely on a machine so that the cutting edge of the tool will be positioned precisely as required particularly on numerically-controlled machines.

Another object of the invention is to provide tool block clamping means for the purpose mentioned, which will be of extremely simple construction and very easy to manipulate.

Other objects of the invention will be apparent hereinafter from the specification and from the recital of the appended claims, particularly when read in conjunction with the accompanying drawing.

Figure 1:
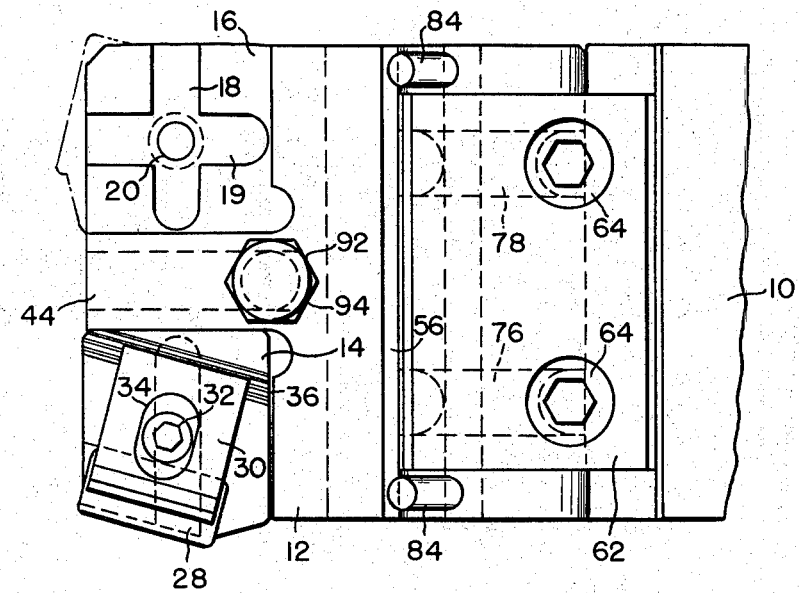
Figure 2:
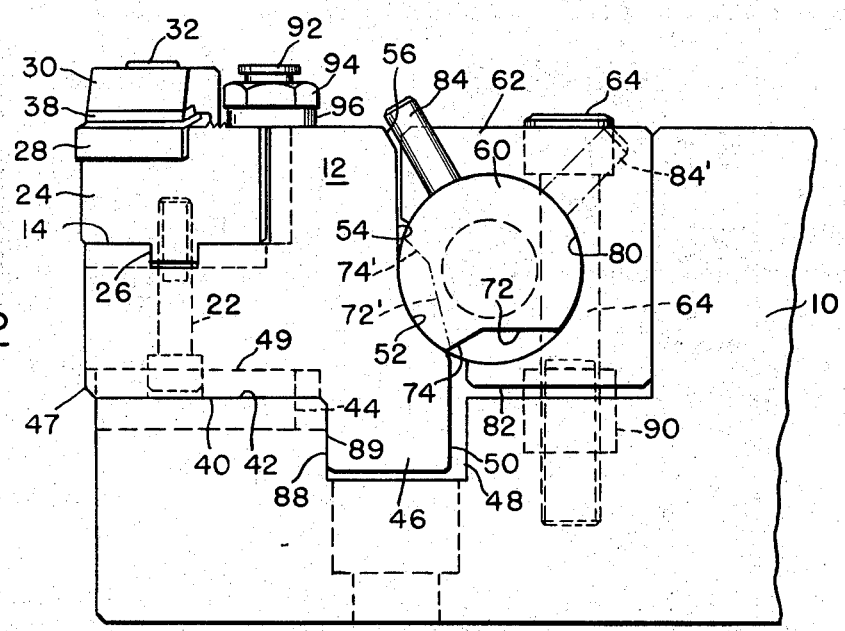
Figure 3:
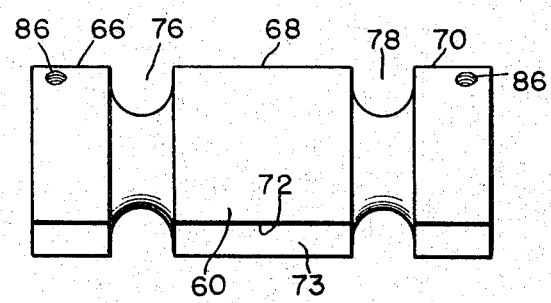
Figure 4:
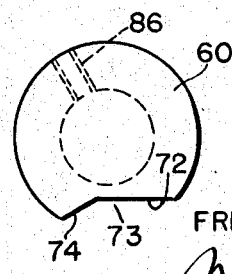

In the drawing:
FIG. 1 is a plan view of a tool block made according to one embodiment of this invention, and showing the means for fastening the block in position on a lathe;
FIG. 2 is a side elevation of the parts shown in FIG. 1;
FIG. 3 is an elevational view of the clamping cam or bar for securing the tool block in position; and
FIG. 4 is an end view of this cam or bar.

Referring now to the drawing by numerals of reference, 10 denotes a cross slide or tool shank supported on the carriage of a lathe; and 12 designates the tool block. In the instance shown, the tool block is provided with two seats 14 and 16 on which tools may be mounted. Of the two shown, only the seat 14 has a tool mounted on it. The seats on the tool block are formed on their upper faces with grooves 18 and 19 which intersect at right angles; and the tool block is drilled with holes 20, which intersect the cruciform grooves formed by the intersecting grooves 18 and 19 at the center thereof. The holes 20 are adapted to receive bolts 22 by which two supporting plates 24 may be fixed to the tool block.

The plates 24 are formed with tongues 26 on their lower surfaces adapted to be engaged selectively in the grooves 18 or 19 of the tool seat.

Each tool seat may carry one or more tool bits. These may be for facing, turning, boring, or similar machining operations. In the instance shown, there is a tool bit 28 secured to the plate 24 by a clamping plate 30 and a bolt or screw 32. The bolt or screw 32 passes through a groove 34 in the clamp 30. The clamp has at its rear lower edge serrations to engage in serrations 36 formed on the upper face of the plate 24 to hold the clamp against shifting when bolt 32 is tightened. In the instance shown, there is a shim 38 interposed between the tool bit 28 and the clamp 30.

All this is known construction and forms no part of the present invention.

The bottom surface 40 of the tool block 12 is generally plane and is adapted to seat on a plane surface 42 on the cross slide 10. A key 44, which engages in registering grooves in the block and the cross slide, locates the block laterally on the cross slide. The block has a projection or rib 46 at its bottom rear, which engages in a slot or groove 48 in the slide 10. The projection 46 has a plane rear face 50 for the lower portion of its height, an arcuate cylindrical surface 52 for the intermediate portion of its height, and a plane surface 54 for the upper portion of its height. The surface 54 is offset forwardly from the surface 50 and is connected to the surface 50 by intermediate curved surface 52. The rear upper edge of the tool block may be chamfered as denoted at 56.

For securing the tool block to the slide or carriage 10, a clamp cam or bar 60, a clamping member 62 and bolts 64 are employed. The clamp cam or bar has three axially scpaced lands 66, 68, and 70 (FIG. 3). Each land is cylindrical for the major portion of its perimeter; but the bar itself is recessed for its whole length including the remainder of the perimeters of the lands to provide a notch lying below the cylindrical surfaces of the lands. This notch 73 is bounded by two plane surfaces 72 and 74 which intersect at an obtuse angle. Between the land 66 and the land 68, a groove 76 with an arcuate bottom is formed to clear one of the bolts 64; and between the land 68 and the land 70 a similar groove 78 is formed to clear the other bolt 64.

The clamping member 62 is formed with an arcuate cylindrical recess 80 adapted to receive the clamp cam. The surface 80 is of the same curvature and diameter as the surface 52 of the tool block 46 so that cylindrical surfaces of the cam member 60, which are also of this same curvature and diameter, may seat simultaneously on the surfaces 52 and 80. The groove or slot 82 in the slide or carriage 10 is somewhat greater in depth than the depth of the clamping member 62.

The clamp cam or bar 60 can be nested at all times in the clamping member 62. It is adapted to be rotated by handles 84, which are threaded into the holes 86 at opposite ends of the clamp cam. The clamp cam is longer than the clamping member 64 so that it extends axially at both ends beyond the clamping member; and the handles 84 are positioned beyond the ends of the clamping member 62 so that either can readily be engaged to rotate the clamp cam 60.

When the cam bar 60 is in the full line position of FIG. 2, and the bolts 64 are tightened up, the arcuate surfaces of the clamp cam 60 force the tool block downwardly to wedge the bottom surface 40 of the tool block against its seat 42, and to wedge the side 88 of the projection on the block against the forward side wall 89 of the groove 48 in the slide. In this wedging operation, the cam member 60 forces the tool block 12 in a downwardly inclined direction to seat it firmly and securely on the surfaces 42 and 89 as described.

To remove the tool block from the machine and to substitute another tool block, it is not necessary to remove the clamp cam 60, but only to loosen the bolts 64 slightly and rotate the clamp cam by handle or handles 84 to bring its recess 72–74 into registry with the rear face of the tool block.

When the clamp cam 60 is in the dotted line position, shown in FIG. 2, with the plane surfaces of its recess 73 in the positions indicated in dotted lines at 72' and 74', a tool block 12 can readily be positioned in, or removed from the tool slide 80. When the handles are rocked from the dotted line position shown at 84' in FIG. 2 to the full line positions shown at 84 in that figure, the cylindrical portions of the lands 66, 68 and 70 of the clamping member are engaged with the cylindrical arcuate surface 52 of the tool block to hold the tool block on the slide. By tightening up on the bolts 64, then, the tool block 12 can be rigidly clamped to the slide.

Tool holders constructed according to the present invention are very valuable for use in machines operating on computerized programs. The positions of the tools on the tool blocks can be adjusted precisely on the bench so that their cutting edges have a predetermined precise position. When a tool block with a tool so positioned is put on a lathe or other machine tool, then, and the tool block is clamped in place, the cutting edge of the tool will be precisely positioned on the machine. Through key 47 the tool block is accurately held laterally, and through the action of the bar 60, clamping member 62 and bolts 64, the tool block is seated precisely against the front wall 89 of the groove 48 and on the seat 42.

With less than one turn of the bolt 64, a tool block can be released, and a new tool block can be fastened securely to the lathe.

To aid in quick release of the bolts, each may be mounted in the slide 10 in a spring type ball seal 90 of known construction that forms no part of the present invention.

Since the tools heat up during cutting and their heat is transmitted to the tool block, it is desirable to provide some means for lifting the tool block off the lathe after the securing bolts 64 have been loosened and the wedging member 60 turned to released position. For this purpose, we have provided a stud 92 which has a hexagonally-shaped collar 94 intermediate its ends and which is threaded into the block 12 and which is recessed at 96 beneath the head 94 so that it can be engaged by a fork-shaped tool to lift the tool block up and off the machine after the tool block is released. The lifting tool may be provided with a wrench portion, which engages hex head 94, while the fork portion of the tool engages under this head 94 in groove 96. The wrench portion can be used, also, to manipulate the bolts 64.

Having thus described our invention, what we claim is:

1. In a machine tool, the combination with a support which has a seat thereon,
   of a tool block removably mounted on said support and having an arcuate surface, and
   means for clamping said tool block on said seat comprising a clamping member,
   a bar rotatably mounted in said clamping member and having a perimetral surface a portion of which is curved complementarily to said arcuate surface and another portion of which is notched to clear said arcuate surface, and
   means for moving said clamping member to clamping position to engage the curved perimetral portion of said clamp bar with said arcuate surface to clamp said tool block rigidly on said seat, said means when released permitting rotation of said bar to bring said notch into registry with said arcuate surface to permit removal of said tool block from said support.

2. In a machine tool, the combination claimed in claim 1, wherein
   said arcuate surface is a concave cylindrical surface, and
   said curved perimetral portion of said bar is a matching convex cylindrical surface.

3. In a machine tool, the combination claimed in claim 2, wherein
   said arcuate surface is at the rear of said tool block.

4. In a machine tool, the combination claimed in claim 3, wherein
   said support has a groove therein,
   said tool block has a projection engageable in said groove,
   said seat comprises a plane upper surface on said support and a plane forward wall of said groove at right angles to said plane upper surface,
   said tool block has a plane bottom surface to seat on said plane upper surface, and said projection has a plane forward surface to seat against and plane forward wall, and
   said arcuate surface is an arcuate cylindrical surface inclined forwardly and upwardly and adjoining said forward surface.

5. In a machine tool, the combination claimed in claim 1, wherein said clamping means includes a bolt threadable into said support, and
   said bar has a peripheral groove to clear said bolt.

6. In a machine tool, the combination claimed in claim 4, wherein said clamping means includes a bolt threadable into said support, and
   said bar has a peripheral groove to clear said bolt.

7. In a machine tool, the combination claimed in claim 6, wherein said bolt is releasably threaded into said support in a direction perpendicular to the plane upper surface of said seat and parallel to the plane forward wall of said groove.

References Cited

UNITED STATES PATENTS

| | | | |
|---|---|---|---|
| 2,371,377 | 3/1945 | Braun | 82—37 |
| 3,320,840 | 5/1967 | Brekke | 82—37 |

LEONIDAS VLACHOS, Primary Examiner